Sept. 2, 1947.  J. C. MALEN  2,426,628
PNEUMATIC TIRE DEVICE
Filed July 21, 1945  2 Sheets-Sheet 1

INVENTOR.
Jarly Carl Malen
BY
Ralph L Chappell
ATTORNEY

INVENTOR.
Jarly Carl Malen

Patented Sept. 2, 1947

2,426,628

UNITED STATES PATENT OFFICE 2,426,628

PNEUMATIC TIRE DEVICE

Jarly C. Malen, United States Navy

Application July 21, 1945, Serial No. 606,466

4 Claims. (Cl. 152—330)

(Granted under the act of March 3, 1883, as amended April 30, 1928; 370 O. G. 757)

The present invention concerns an attachment for a pneumatic tire, and particularly concerns a mechanical attachment for a pneumatic tire mounted wheel whereby deflation of the pneumatic tire will cause operation of the attachment to provide a mechanical tread for the wheel of the same diameter as the inflated pneumatic tire.

The use of pneumatic tires on passenger cars, trucks and similar vehicles provides a potential source of danger since unexpected deflation of the pneumatic tire frequently results in damage to the tire, inner tube and wheel rim, as well as causing injury to personnel in the car when the deflated tire causes the vehicle to go out of steering control. Likewise, great trouble from deflation of the pneumatic tires on aircraft occurs when such aircraft are parked, taxiing, or during take-off or landing operations. In such cases the occurrence of a flat tire causes one side of the plane to drop with the result that ground loops or serious crashes frequently result therefrom. Such accidents from failure of pneumatic tires can be prevented if suitable means are provided for operating when the pneumatic tire is deflated to provide a tread of the same diameter as that of the inflated pneumatic tire, so that the vehicle or aircraft will not be unbalanced about its longitudinal axis.

The present invention solves this problem by providing a mechanical attachment for the wheel upon which the pneumatic tire is mounted and which automatically operates in response to deflation of the pneumatic tire to provide a tread of the same diameter as that of the inflated pneumatic tire. This is accomplished by providing a series of independently mounted mechanical feet, each of which swings outwardly into radially extended position to support the inside of the tire casing upon deflation of the inner tube.

An object of the invention is to provide an attachment for a pneumatic tire mounted wheel which will operate upon deflation of the pneumatic tire to provide a tread of the same diameter as the inflated pneumatic tire.

Another object of the invention is to provide an attachment for a pneumatic tire mounted wheel which will automatically operate upon deflation of the inner tube to mechanically support the tire casing against collapse.

A further object of the invention is to provide a pneumatic tire mounted wheel with a series of independently mounted feet, each of which swings outwardly in response to deflation of the inner tube to mechanically support the tread of the tire casing.

Further objects and advantages of this invention, as well as its construction, arrangement and operation, will be apparent from the following description and claims in connection with the accompanying drawings, in which, Fig. 1 is a transverse section through a pneumatic tire and tube in inflated condition with the supporting rim, and showing a preferred embodiment of the invention mounted with respect thereto.

Fig. 4 is a diagrammatic view taken approximately along the line 4—4 of Fig. 1.

Fig. 5 is a fragmentary view in section taken substantially along the line 5—5 of Fig. 3.   L Fig. 6 is a fragmentary view in section taken substantially along the line 6—6 of Fig. 2.

Figure 1:
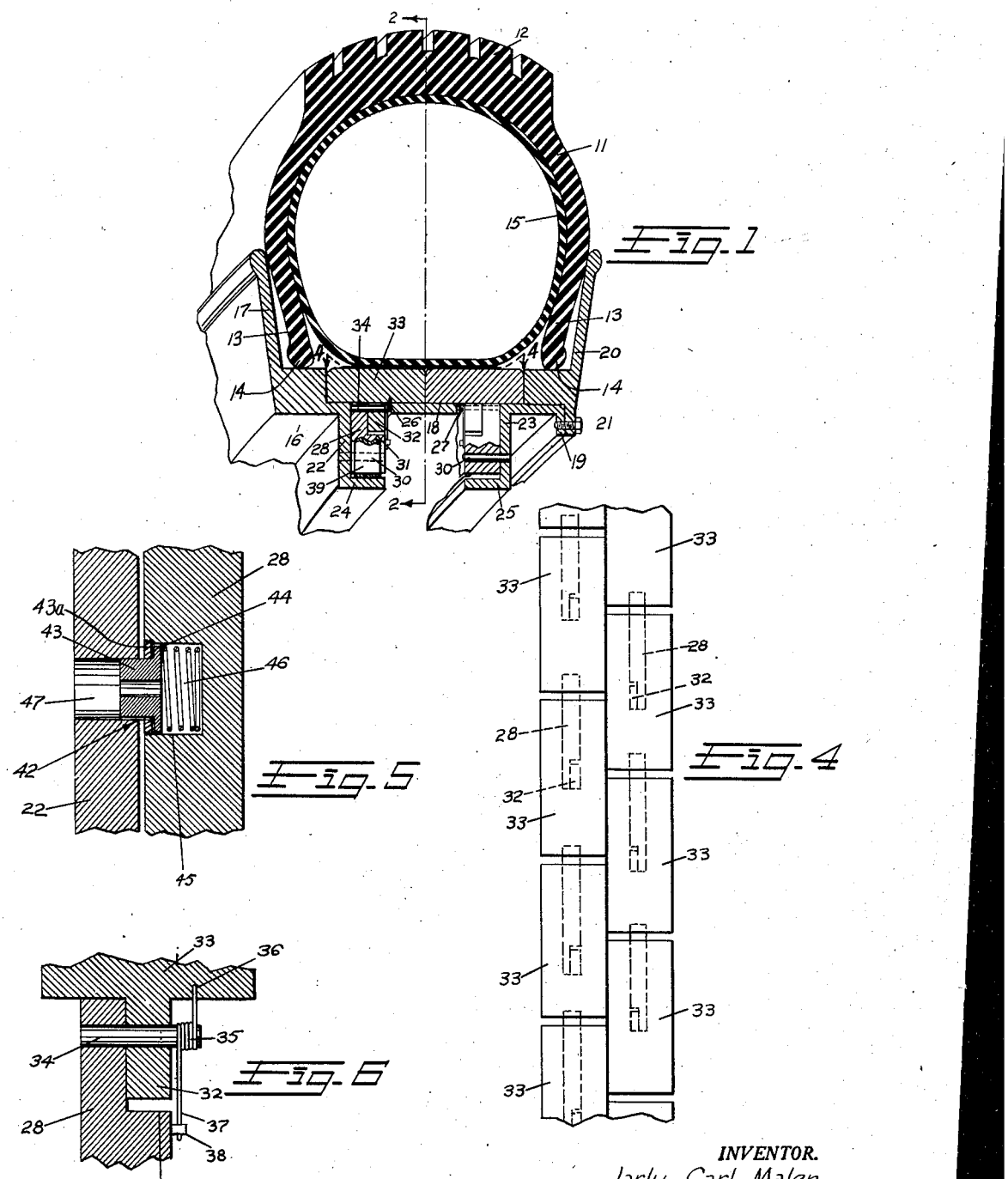

Fig. 1 shows a conventional tire casing 11 having a tread 12, side walls 13 and a bead 14. Disposed within tire casing 11 is an inner tube 15 which is shown as being inflated to support tire casing 11 against collapse. Tire casing 11 and inner tube 15 are supported upon a metal rim 16 having an integral side wall 17, a main supporting surface 18, and a radially inwardly extending anchor flange 19. A detachable side wall 20 is secured to anchor flange 19 by means of a series of bolts 21. Side wall 20 may be removed from rim 16 for the purpose of mounting and dismounting tire casing 11 and inner tube 15.

Extending radially inward from the rim main supporting surface 18 are a pair of parallel spaced flanges 22 and 23 provided with terminal offset portions 24 and 25 respectively, which extend toward each other. Formed in main supporting surface 18, above offset portion 24, is a series of openings 26, while a similar series of openings 27 is provided above offset 25. Openings 26 and 27 are arranged in staggered relation with respect to each other.

Disposed in each opening 26 is a leg 28 provided at its inner end with a heel 29 and mounted for rotation upon flange 22 by a pivot 30. At its outer end leg 28 is recessed at 31 to accommodate mounting lug 32 of a rocker head 33, which is mounted for rocking movement on leg 28 by means of a pivot 34. Rocker head 33 is resiliently urged into the operative position shown in Fig. 3 by means of a spring 35 (Fig. 6) which is mounted on the extremity of pivot 34, and one end of which extends at 36 into rocker head 33, while the other extremity 37 extends through a pin 38 which is rigidly mounted in leg 28. In the retracted position shown in Fig. 2 rocker head 33 may be rocked against the action of spring 35 into nested position.

Figure 2:
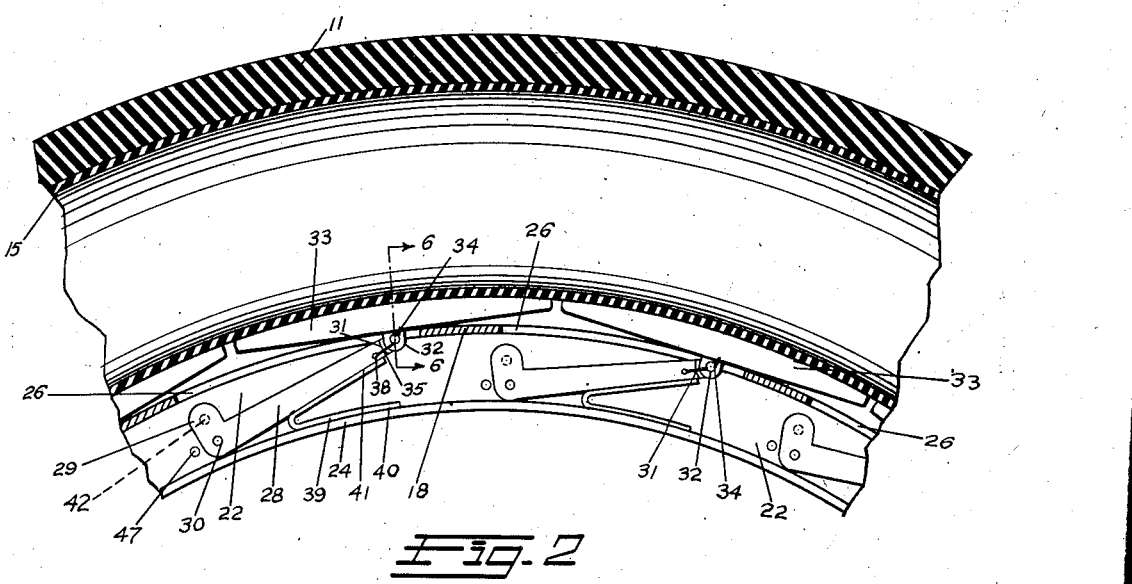
Fig. 2 is a fragmentary view in longitudinal section taken substantially along line 2—2 of Figure 1, with the tire and tube in inflated condition.
Figure 3:
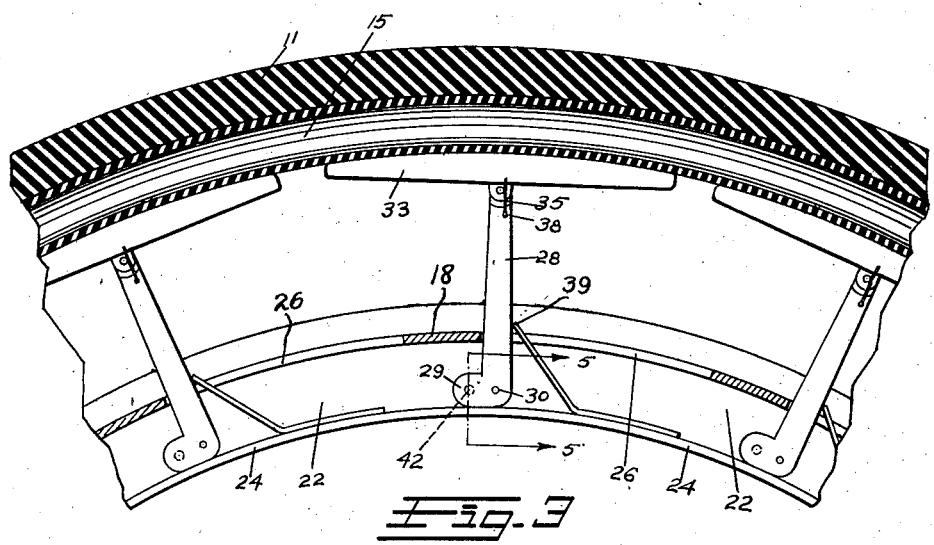
Fig. 3 is a fragmentary view in longitudinal section similar to Fig. 2 but with the inner tube in deflated condition and the mechanical attachment of the invention extended to support the tire casing against collapse.

As seen in Fig. 2, a leaf spring 39 is provided to urge leg 28 from the retracted position shown in Fig. 2, when inner tube 15 is inflated, into the extended position shown in Fig. 3 when inner tube 15 is deflated. One arm 40 of leaf spring 39 reacts against offset 24 of flange 22 while the other arm 41 of leaf spring 39 reacts against leg 28.

A locking detent 42 is provided (Fig. 5) for locking leg 28 in the extended position shown in Fig. 3. Locking detent 42 comprises a plunger 43 having a head portion 44 adapted for reciprocation within a recess 45 formed in the face of leg 28 adjacent flange 22. A compression spring 46 is disposed within recess 45 for constantly urging plunger 43 against the surface of flange 22. A retaining disc 43a of conventional type serves to retain plunger 43 against escape from recess 45. A recess 47 is provided in the face of flange 22 in such position that when leg 28 is extended outwardly as shown in Fig. 3, plunger 43 may seat itself within recess 47 to lock leg 28 in extended position.

The construction of leg 28 and rocker head 33 disposed in each rim opening 26 has been described. Each rim opening 27 is provided with a similar construction but reversed from left to right as indicated in Fig. 1, and for convenience, similar parts have been given similar reference characters. As previously stated, openings 26 and 27 are staggered with respect to each other, and as seen in Fig. 4 rocker heads 33 disposed above openings 26 are staggered with respect to rocker heads 33 disposed above openings 27.

Operation of the device is as follows. To mount tire 11 and inner tube 15 for operation upon rim 16, detachable side wall 20 is removed, rocker heads 33 are retracted inwardly against the cushion of leaf springs 39 into the position shown in Figs. 1 and 2, and tire casing 11 and inner tube 15 are mounted as shown in Fig. 1. Side wall 20 is then secured in place by bolts 21. Tire casing 11 is then conditioned for normal use by inflating inner tube 15 and in such circumstances, rocker heads 33 are retained in their retracted position by the pneumatic action of inner tube 15.

In the event that inner tube 15 becomes deflated, legs 28 under the influence of leaf springs 39 will immediately be extended into the position shown in Fig. 3, and rocker heads 33 under the influence of springs 35 will assume the position shown in Fig. 3. Detents 43 will seat within their respective recesses 47 to lock arms 28 in extended position. Legs 28 and rocker heads 33 will thus serve to support tire casing 11 against collapse, and will provide a tread of the same diameter as that possessed by the inflated tire. Under these circumstances, inner tube 15 will be crushed into collapsed condition between rocker heads 33 and the inside of tire casing 11.

When it is desired to dismount tire casing 11 and inner tube 15 after a flat tire has occurred, side wall 20 is removed, detents 43 are urged into recesses 45 so that legs 28 may be retracted inwardly with heads 33 to permit tire casing 11 and inner tube 15 to be removed from rim 16.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In combination, a wheel, a tire casing mounted on said wheel, a pneumatic tube in said tire adapted upon inflation to support said casing against collapse, a series of members independently pivoted on said wheel and resting against the inner periphery of said pneumatic tube when inflated, resilient means for urging said members outwardly into extended position upon deflation of said tube, and means for locking said members in extended position to support said tire casing internally against collapse, said members having adjustable terminal portions which are capable of automatic adjustment to the contour of the tire casing.

2. A device for use in a wheel having a tire casing and a pneumatic tube in the casing to prevent collapse thereof comprising a series of members independently pivoted on the wheel and resting against the inner periphery of the pneumatic tube when inflated, resilient means for urging said members outwardly into extended position upon deflation of the tube, and means for locking said members in extended position to support the tire casing internally against collapse, said members having adjustable terminal portions which are capable of automatic adjustment to the contour of the tire casing.

3. In combination, a wheel having a rim, a tire casing mounted on said rim, a pneumatic tube in said casing adapted upon inflation to support said casing against collapse, said rim having a pair of spaced parallel flanges extending radially inward therefrom, said flanges having terminal portions extending toward each other and parallel to said rim, a series of openings in said rim radially outward of each of said terminal portions, the series of opening outwardly on one terminal portion being staggered relative to the openings outwardly of the other of said terminal portions, a series of legs extending one through each of said openings, each leg being pivoted at one end on one of said flanges and at its other end supporting a rocker head adopted upon inflation of said tube to seat against the outer periphery of said rim and the inner periphery of said tube, spring means reacting at one end against said leg and at its other end reacting against one of said terminal portions to swing said leg upon deflation of said tube into radially extended position whereby said rocker head may accommodate itself to the contour of the inner surface of said casing whereby said casing may be supported against collapse, each of said legs being provided with a spring actuated detent adapted to seat in a recess in the adjacent flange to lock said leg in extended position, and spring means for urging said rocker head into perpendicular position relative to said leg.

4. In combination, a wheel, a tire casing mounted on said wheel, a pneumatic tube in said tire adapted upon inflation to support said casing against collapse, and mechanical means mounted on said wheel and operative upon deflation of said tire to support said casing internally against collapse, said mechanical means comprising a plurality of pivoted members adapted to swing outwardly into extended position upon deflation of the tube and including means for locking said members in extended position to support said tire casing internally against collapse.

JARLY C. MALEN.

REFERENCES CITED

The following references are of record in the file of this patent:

UNITED STATES PATENTS

| Number | Name | Date |
|---|---|---|
| 2,286,507 | Quinn | June 18, 1942 |